Patented Aug. 8, 1950

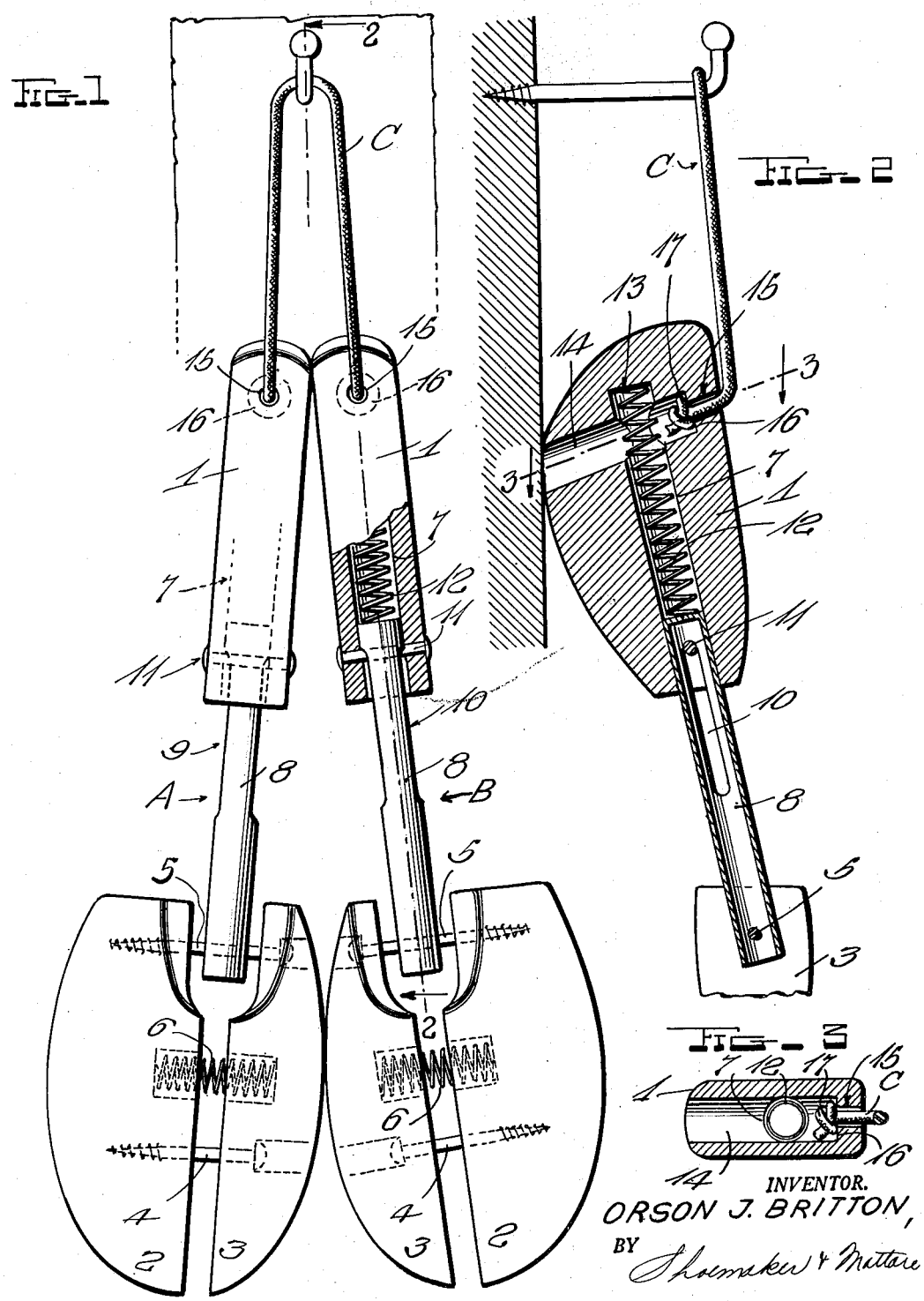

2,517,967

UNITED STATES PATENT OFFICE 2,517,967

SHOE TREE

Orson J. Britton, Fairport, N. Y., assignor to Rochester Shoe Tree Co., Inc., Rochester, N. Y., a corporation of New York Application December 26, 1947, Serial No. 793,788

1 Claim. (Cl. 12—128.2)

This invention relates to shoe trees.

Wearers of shoes frequently possess several pairs of shoe trees of different mates, and yet in some respects similar but different, with the result that trees of different shapes or designs are sometimes fitted in a pair of shoes. Sometimes the various shoe trees become separated with relation to mates with a consequent intermingling of trees of different pairs, necessitating handling of various trees to get together proper tree mates on which to fit a particular pair of shoes.

One object of the invention is to provide as an article of manufacture a pair of like or mated shoe trees coupled swingly together by a short flexible element having its ends confined within the bodies of the shoe trees whereby to maintain the trees permanently connected together.

Another object of the invention is to provide a connection between a pair of shoe trees whereby to maintain the trees together in or out of shoes for the convenience of the user.

A still further object of the invention is to provide means for connecting a pair of like or mated shoe trees permanently together whether in or out of shoes and which may be used as a means for hanging or suspending the pair of trees with or without shoes treed thereon from a hook or other support.

It is still further designed to provide a connector for coupling a pair of shoe trees closely together and by means of which the pair of trees with or without shoes thereon may be readily stored or carried from one place to another.

The invention, with other objects and advantages thereof, and the particular construction, combinations and arrangements of parts comprising the same, will be understood from the hereinafter contained detailed description when considered in connection with the accompanying drawings, forming part hereof and illustrating one embodiment of the invention.

In the accompanying drawings:

Fig. 1 is a front elevational view showing a pair of shoe trees suspended or hung from a suitable support;

Fig. 2 is a longitudinal sectional view through a portion of the shoe trees, taken on the line 2—2 of Fig. 1;

Fig. 3 is a transverse sectional view through the heel section of the shoe tree taken on the line 3—3 of Fig. 1.

While a preferred embodiment of the invention is illustrated in the drawings, it will of course be understood that minor changes and modifications may be made in the particular construction shown, and the invention may be embodied in other forms as will appeal to those skilled in the art and falling within the scope of the appended claim without departing from the spirit of the invention.

Referring now more particularly to the accompanying drawings, the reference characters A and B indicate, generally, a pair of like or matched conventional shoe trees which are connected together by a flexible connector C of any suitable character and in any suitable manner for a purpose hereinafter explained.

Each shoe tree includes a heel section 1 and laterally expansible toe section portions 2 and 3 mounted on guide pins 4 and 5 and normally expanded apart by a spring 6 arranged between the pins 4 and 5.

Each heel section has a longitudinal bore 7 in which is slidably mounted a tubular connector rod 8. This rod 8 is pivoted at the forward end thereof to the respective pin 5 of the respective toe section. The rod 8 has oppositely disposed slots 9 and 10, between the ends thereof, which slide over a pin 11 mounted transversely in the respective heel section and which pin 11 is engageable with the ends of said slots 9 and 10 to limit movements of the rod 8 upon movements of the toe sections toward and away from the respective heel sections.

A normally expansible spring 12 is mounted at one end in a seat 13 in each heel section. The seat 13 is disposed in substantially longitudinal alignment with the longitudinal bore 7. The spring 12 has its forward end extending into the longitudinal bore 7 in engagement with the inner end of the rod 8 to normally force said rod outwardly.

A substantially vertical bore 14 is formed adjacent the rear of each heel section and opens upwardly from the bottom of the heel section and terminates slightly short of the top of the heel section and intersects with the longitudinal bore 7, said spring 12 extending across said bore 14, as shown.

An aperture 15 is formed in the top of each heel section near the rear thereof and in alignment with said substantially vertical bore 14 and which aperture is smaller in diameter than the diameter of said bore 14 and communicates with the respective bore 14 adjacent the top of the heel section and above the respective spring 12 forming an internal shoulder 16 in each heel section.

Before the springs 12 of the respective heel sections are placed in operative positions in their respective seats 13 and the ends of the respective rods 8, the ends of the flexible connectors C are passed through the respective apertures 15 and knotted, as at 17. The knots 17 are movably disposed against the respective shoulders 16, thereby securing the ends of the flexible connectors within the respective heel sections between the tops of the bores 14 or between the apertures 15 and the expansible springs 12. This disposition of the knotted ends of the connector elements C maintains the knotted ends of the connector within the substantially vertical bores 14 against accidental dislocation or detachment from the shoe trees and against movement of the knotted ends of the connector from the bores 14 of the trees. The ends of the connector C whether knotted or not are designed to be secured permanently in the upper ends of the substantially vertical bores 14 and above the respective expansible springs 12.

From the foregoing, it will be seen that I have provided an article of manufacture consisting of a relatively short flexible element of any suitable character which has its opposite ends permanently secured within the bodies of two like, matched or mated shoe trees to permanently connect the trees together and to provide a connection by which the connected pair of trees may be hung or suspended with or without shoes thereon from any suitable support or which may be maintained in connected relation on a floor or similar support.

What is claimed is:

In an article of the character described, a shoe tree including a heel section having a longitudinal bore and a substantially vertical bore intersecting the longitudinal bore intermediate the ends of the latter and terminating short of the top surface of the heel section, the rear end of the longitudinal bore being closed and constituting a seat at the rear of said substantially vertical bore and communicating with the substantially vertical bore, the remaining portion of the longitudinal bore communicating with the substantially vertical bore at the front of the latter in alignment with the said seat, a compressible spring located in said longitudinal bore and extending across the substantially vertical bore and at its rear end seated in said seat, the heel section having an aperture at its top leading into said substantially vertical bore centrally of the longitudinal axis of the latter and smaller in diameter than the diameter of the substantially vertical bore, forming an interior shoulder in the latter bore adjacent the top of the heel section, and a suspending and carrying means, including a flexible element passing through said aperture and having a knotted end located in the substantially vertical bore between said spring and said shoulder, said spring preventing said knotted end of said flexible element from accidentally passing out of the substantially vertical bore at the lower end of the latter and said shoulder preventing accidental dislodgement of said knotted end of said flexible element out of the upper end of the substantially vertical bore, thereby confining said knotted end of said flexible element permanently within the substantially vertical bore between said spring and said shoulder.

ORSON J. BRITTON.

REFERENCES CITED

The following references are of record in the file of this patent:

UNITED STATES PATENTS

| Number | Name | Date |
| --- | --- | --- |
| 1,358,963 | McGrath | Nov. 16, 1920 |
| 2,089,976 | MacMichael | Aug. 17, 1937 |
| 2,303,469 | Janic | Dec. 1, 1942 |
| 2,340,404 | Mutch | Feb. 1, 1944 |
| 2,376,097 | Stamm | May 15, 1947 |

FOREIGN PATENTS

| Number | Country | Date |
| --- | --- | --- |
| 360,722 | France | May 1, 1906 |